United States Patent [19]
Schneider et al.

[11] Patent Number: 5,775,729
[45] Date of Patent: Jul. 7, 1998

[54] INTEGRAL HEAD/TORSO AIRBAG AND KNEE AIRBAG RESTRAINT SYSTEM

[75] Inventors: David W. Schneider, Waterford; Patrick G. Jarboe, Almont Township; Daniel J. Snyder, Sterling Heights; Michael A. Macocha, Oxford, all of Mich.

[73] Assignee: Autoliv ASP, Inc., Ogden, Utah

[21] Appl. No.: 851,625

[22] Filed: May 6, 1997

[51] Int. Cl.$^6$ ................................................ B60R 21/22
[52] U.S. Cl. ............................ 280/730.1; 280/728.2; 280/729; 280/736; 280/742; 280/753
[58] Field of Search .......................... 280/730.1, 728.1, 280/728.2, 729, 736, 740, 74 L, 753

[56] References Cited

U.S. PATENT DOCUMENTS

| | | | |
|---|---|---|---|
| 3,610,657 | 10/1971 | Cole | 280/150 AB |
| 3,618,978 | 11/1971 | Klove, Jr. et al. | 280/150 AB |
| 3,767,225 | 10/1973 | Mazelsky | 280/150 AB |
| 3,784,225 | 1/1974 | Fleck et al. | 280/150 AB |
| 3,799,573 | 3/1974 | McDonald | 280/150 AB |
| 3,937,258 | 2/1976 | Loomba | 280/742 |
| 4,043,572 | 8/1977 | Hattori et al. | 280/729 |
| 4,076,277 | 2/1978 | Kuwakado et al. | 280/738 |
| 4,198,075 | 4/1980 | Kob et al. | 280/753 |
| 4,360,223 | 11/1982 | Kirchoff | 280/729 |
| 4,948,168 | 8/1990 | Adomeit et al. | 280/732 |
| 5,240,283 | 8/1993 | Kishi et al. | 280/729 |
| 5,458,366 | 10/1995 | Hock et al. | 280/729 |
| 5,513,877 | 5/1996 | Mac Brien et al. | 280/732 |
| 5,570,901 | 11/1996 | Fyrainer | 280/730.1 |

*Primary Examiner*—Eric D. Culbreth
*Attorney, Agent, or Firm*—George W. Rauchfuss, Jr.

[57] ABSTRACT

A trough-shaped airbag canister and module assembly has an integral diffuser and diverter for permitting simultaneous deployment of a head/torso airbag and a knee airbag. The integral diffuser and diverter in the canister diffuses a first portion of inflation gases from an inflator to a mouth of a head/torso airbag and diffuses and diverts a second portion of the inflation gases through a kneebag inflation port in a sidewall of the canister and into a mouth of a knee airbag.

20 Claims, 3 Drawing Sheets

INTEGRAL HEAD/TORSO AIRBAG AND KNEE AIRBAG RESTRAINT SYSTEM

FIELD OF THE INVENTION

This invention relates to an integral restraint system for a vehicle occupant and more particularly to an occupant restraint system comprising an integral head/torso airbag and a knee airbag inflatable by a single inflator.

BACKGROUND OF THE INVENTION

Occupant restraint systems utilizing airbags have been employed to protect vehicle occupants in the event of a collision or other rapid deceleration cause. For passengers in a motor vehicle, the airbags have generally been mounted in the upper portion of the dashboard or instrument panel to deploy in a manner to protect the head and torso of the vehicle occupant. However, when a vehicle is involved in a frontal crash, the occupant is driven forward and can slide into or submarine under the instrument panel. Such action can also cause the occupant to rotate out of position for proper deployment of the head and torso airbag.

Accordingly, it has become increasingly common to propose that a knee bolster panel be employed to restrain the occupant's knees from translating forward in the event of a crash. It has been proposed that such knee bolster panels be placed in front of the position the knees will occupy prior to their forward movement.

Various systems have been proposed for providing a vehicle occupant restraint system which includes both a head/torso airbag and a kneebag or knee bolster. For example, in U.S. Pat. No. 4,360,223 there is disclosed a kneebag contained within a torso airbag, both being attached directly to an inflator, with the kneebag inflating first and the head/torso airbag inflating later by the inflation gas passing out of an orifice in the kneebag. Other bag within bag systems are disclosed in U.S. Pat. Nos. 3,610,657 and 3,767,225.

Another approach to providing both a head/torso airbag and a kneebag is to provide a single multi-lobed airbag that has a head/torso lobe and a knee lobe, such as disclosed in U.S. Pat. Nos. 5,513,877 and 5,240,283.

In addition, numerous systems have proposed the use of separate head/torso airbags and kneebags with separate inflation systems for each bag. Also numerous systems have been proposed for providing knee bolster panels in addition to the kneebags.

However, none of these proposed systems have been entirely satisfactory and present various drawbacks and disadvantages. For example, in the bag within a bag and multi-lobe bag concepts an out-of-position occupant can prevent deployment of the kneebag and thereby inhibit or prevent full and/or proper deployment of the head/torso airbag. Also, even with the filling of the kneebag there may be insufficient time to properly fill the head/torso airbag. Also, with the bag within a bag construction the kneebag is unable to have a knee bolster panel component present for simultaneous deployment. In the separate multiple bag arrangements the use of multiple inflators has been required, increasing both cost and space requirements.

It is therefore desirable, and an object of this invention, to provide a vehicle occupant restraint system that provides a head/torso airbag and a separate knee airbag in which both deploy from a single or common inflator. A further object of the invention is to provide such a restraint system in which the knee airbag can actuate a knee bolster panel in connection therewith. A still further object of this invention is to provide such an inflation restraint system in which both the knee airbag and the head/torso airbag can be inflated concurrently from the same inflation source and permit deployment of the head/torso airbag even if an out-of-position occupant prevents inflation of the knee air bag. A further additional object of this invention is to provide such an inflation restraint system which directs an appropriate amount of inflation gas from a single inflator into both head/torso airbag and the knee airbag so that appropriate inflation levels of each are obtained, and obtained within a required time period. Also, a further object of this invention is to provide such a restraint system that can require a less aggressive inflation system producing earlier restraint and lower forces on the chest of the occupant. Yet another object of this invention is to provide such a restraint system in an airbag module that permits a more traditional and ergonomic packaging area for the system.

SUMMARY OF THE INVENTION

A restraint system for obtaining one or more of the objects of this invention is provided by a vehicle occupant restraint module assembly having separate head/torso and knee airbags for concurrent deployment from a single inflator mounted in a module canister having inflation gas diffuser and inflation gas diverter elements mounted in said module canister for diffusing a portion of inflation gases from the inflator into the head/torso airbag and diverting another portion of the inflation gases into the knee airbag through a kneebag inflation port in a sidewall of the module canister.

In one embodiment of this invention, the vehicle occupant restraint module assembly comprises a trough-shaped canister housing an inflator and having at least one kneebag inflation port in a sidewall of the canister. The trough-shaped canister has an inflation gas diffuser and an inflation gas diverter mounted therein intermediate inflator gas exhaust ports on the inflator and the mouth of a head/torso airbag so that a first portion of the inflation gases from the inflator is diffused and directed into the mouth of a head/torso airbag and a second portion of the inflator gases is diffused and diverted into the mouth of a knee airbag through the kneebag inflation port in the canister sidewall.

In one embodiment of the assembly of the invention, the inflation gas diffuser and the inflation gas diverter comprise a unitary one-piece member which is of a plate of generally opened V-shaped configuration having a plurality of diffuser openings along one edge of the plate and a solid diverter plate portion along an opposite edge of the plate. In another embodiment of the assembly of this invention, the inflation gas diffuser is a first plate member extending between opposing sidewalls longitudinally therealong, and the inflation gas diverter is a second plate member mounted to the sidewall of the canister above the kneebag inflation port and projecting radially inwardly and downwardly from the sidewall towards the inflation gas diffuser.

In further embodiments of the invention, the module assembly is provided with a one-way valve adjacent the kneebag inflation port for permitting inflation gas to enter the knee airbag through the kneebag inflation port and preventing escape of inflation gas from the knee airbag out the kneebag inflation port. In yet another embodiment of this invention the knee airbag is attached to a knee bolster panel for causing deployment of the knee bolster panel upon deployment of the knee airbag. Said knee bolster panel can provide a finish trim piece for the module assembly.

BRIEF DESCRIPTION OF THE DRAWINGS

The invention is illustrated but not limited by the embodiments shown in the following drawings in which:

3

Figure 1:
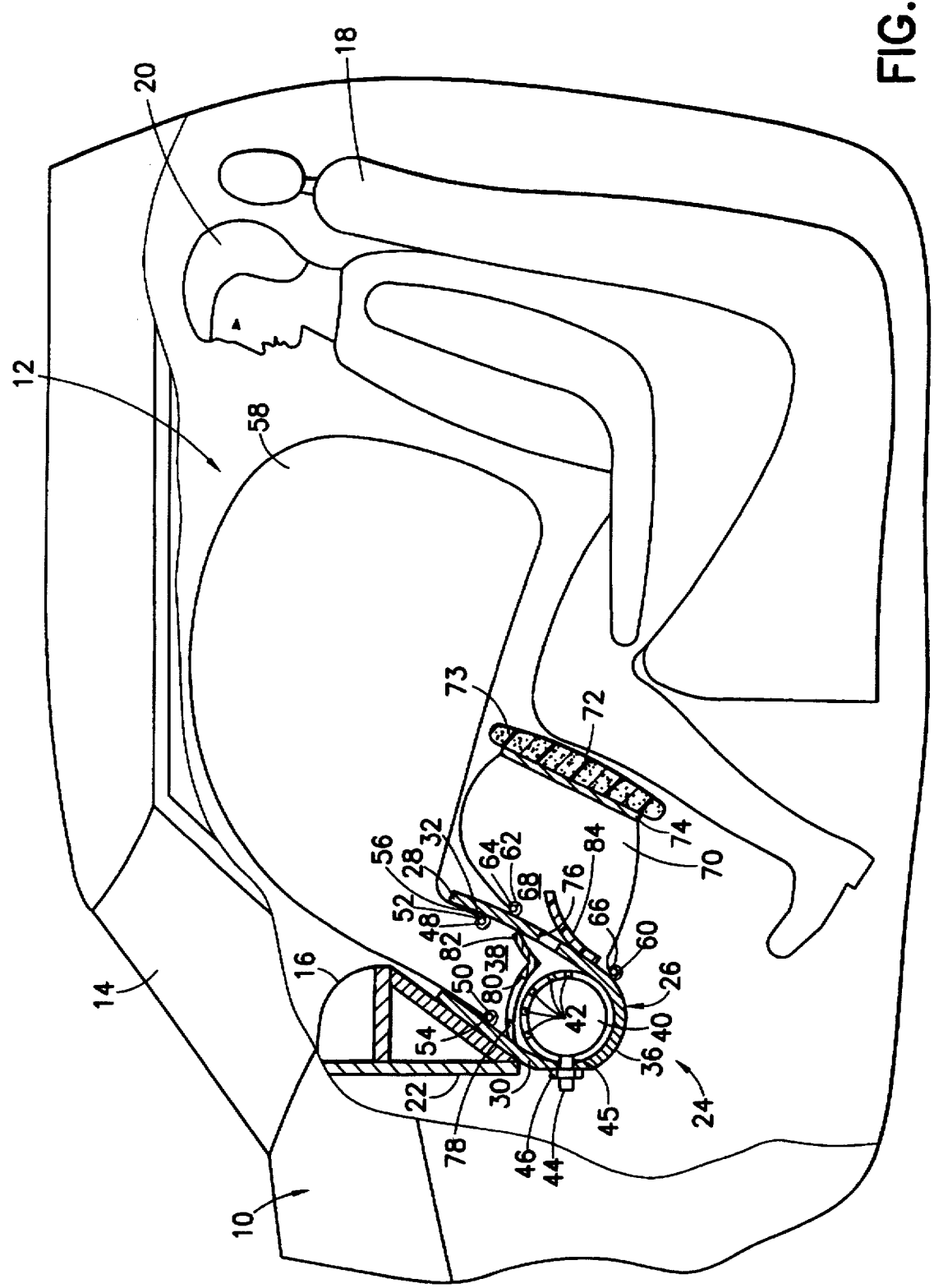
Figure 2:
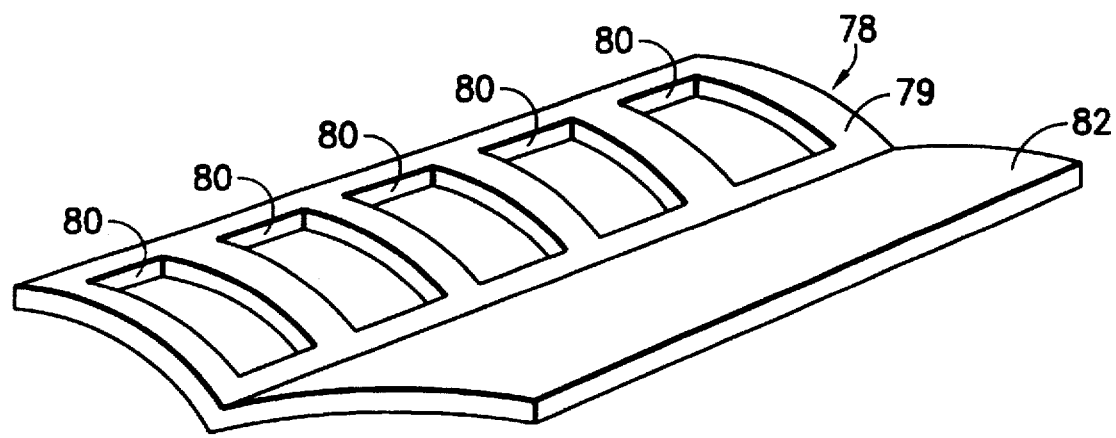
Figure 4:
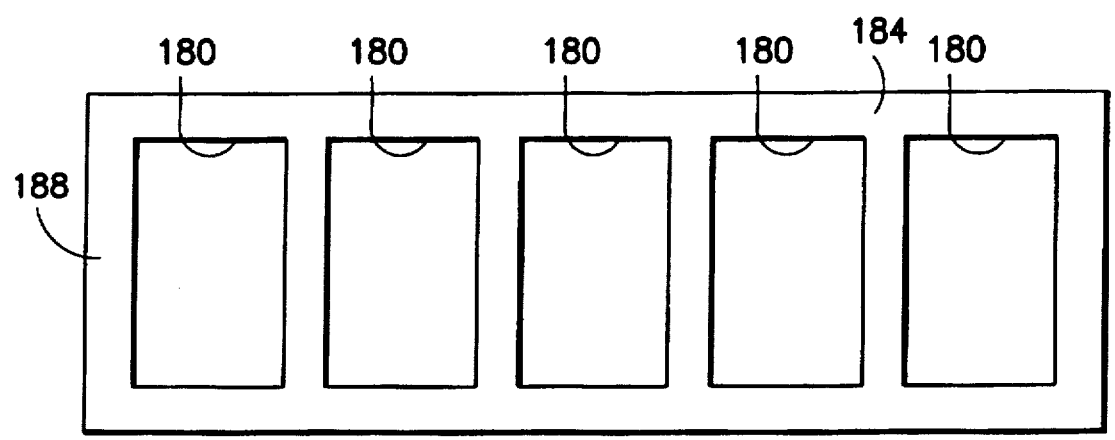
Figure 3:
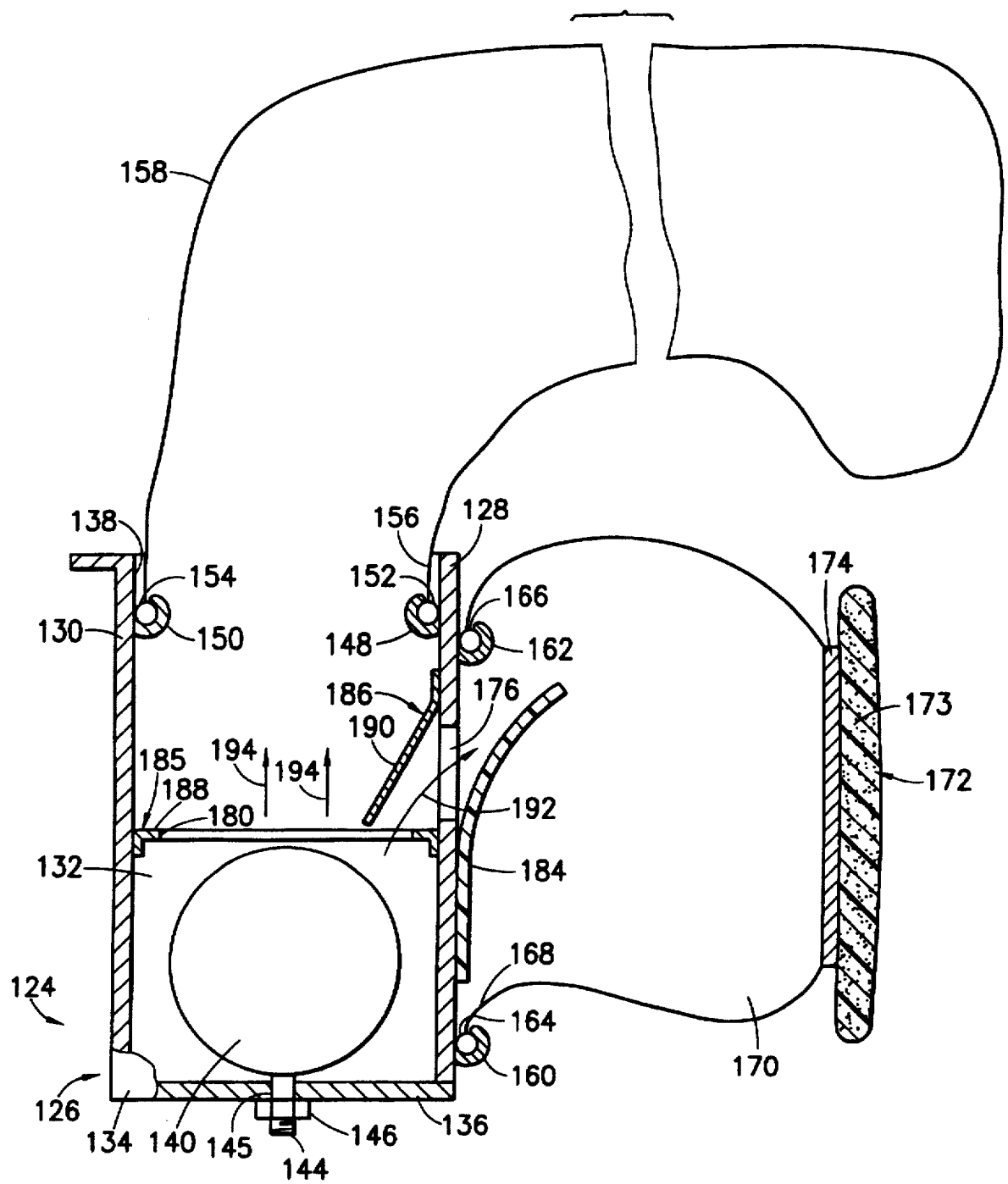

FIG. 1 is a partially broken away, partial simplified view of an automotive vehicle employing an occupant restraint system of this invention with the knee airbag and head/torso airbag both being seen in a deployed condition with respect to an occupant of the vehicle;

FIG. 2 is a perspective view of the unitary one-piece inflation gas diffuser-inflation gas diverter member of the module assembly of FIG. 1;

FIG. 3 is a cross-sectional view, partially broken away, of another embodiment of a module assembly of this invention in which the inflation gas diffuser and the inflation gas diverter are separate components mounted in the module canister; and FIG. 4 is a top plan view of the inflation gas diffuser of FIG. 3.

DETAILED DESCRIPTION OF THE INVENTION

In FIG. 1 there is illustrated an automotive vehicle body 10 having a compartment 12 defined, in part, by a windshield 14 in an instrument panel 16, and in which a front seat 18 is installed and upon which is seated a vehicle occupant 20. A vehicle structural support member 22 is mounted behind and beneath the instrument panel 16.

Mounted to support member 22 by attachment means such as by bolts and hex nuts (not shown) is a vehicle occupant restraint module assembly 24 of this invention. The assembly 24 has a trough-shaped module canister 26 formed with opposing sidewalls 28, 30 opposing endwalls (one being removed for purposes of illustration of the invention) 32 and a bottom wall 36 forming a trough opening 38.

An airbag inflator 40 having a plurality of inflator gas exhaust ports 42 mounted circumferentially around one end of a hybrid-type inflator or axially along a longitudinal length of a pyrotechnic-type inflator is mounted along the bottom wall 36 of the canister 26 by means of one or more threaded mounting studs 44 on the inflator 40 projecting through mounting openings in the canister wall 30, and secured by hex nut 46.

On the internal surface of the sidewalls 28, 30 are provided a first set of slotted airbag mounting channels 48, 50 for receiving retaining rods 52, 54 secured in the mouth portion 56 of a head/torso airbag 58. The external surface of one of the canister sidewalls 28 is provided with a second set of slotted airbag mounting channels 60, 62 for receiving the retaining rods 64, 66 in the mouth portion 68 of knee airbag 70. The portion of the knee airbag 70 opposite mouth portion 68 is attached, such as by a suitable adhesive or hot melt material, to a knee bolster panel 72 which generally comprises a skin and foam 73 covered metallic plate 74.

The canister sidewall 28 to which the knee airbag 70 is mounted is provided with at least one kneebag inflation port opening 76A, which is preferably a single elongated longitudinal slot in sidewall 28, for receiving inflation gas from inflator 40 and permitting entry of inflation gas into the mouth of knee airbag 70 by placement of knee airbag receiving channels 60, 62 on opposite sides of port or ports 76.

A unitary one-piece diffuser-diverter member 78 extends between the opposing sidewalls 28, 30 of the module canister 26 intermediate the inflator 40 and the mouth 56 of head/torso airbag 58. The diffuser-diverter member 78 (FIG. 2) is in the form of a generally open V-shaped plate 79 having a plurality of diffuser openings 80 (only one being

4 shown in FIG. 1) proximate one edge of the plate and being a solid plate portion 82 adjacent the opposite edge of the plate, i.e. the edge of the plate adjoining the wall 28 with the kneebag inflation port 76 therein.

Upon activation of inflator 40 by a suitable sensor (not shown) inflation gases are produced by the inflator and exit therefrom through exhaust ports 42. Diffuser openings 80 in diffuser-diverter member 78 act to diffuse a portion of the inflation gases into the mouth 56 of head/torso airbag 58, and solid plate portion 82 acts to divert another portion of the inflation gases into the kneebag inflation port 76 and into knee airbag 70 through knee airbag mouth 68. It will be readily understood that relative area relationship of the diffuser openings 80 to solid plate portion 82 can be varied over a broad range to provide a range of inflation gases apportioned to the two airbags 58 and 70.

In a preferred form of this invention, a one-way valve member 84 is provided to permit inflation gas to flow into knee airbag 70 through kneebag inflation port 76 and prevent escape of the inflation gas from the knee airbag out the kneebag inflation port. The one-way valve 84 is flapper valve, such as a flexibly resilient thermoplastic film or a resilient spring metal, mounted by any suitable means adjacent kneebag inflation port 76 on sidewall 28 of the module canister 26.

In the embodiment illustrated in FIGS. 3 and 4, the module assembly 124 comprises a trough-shaped module canister 126 formed by opposing sidewalls 128, 130, opposing endwalls 132, 134, and bottom wall 136, and having a trough opening 138.

Along bottom wall 136 is mounted an airbag inflator 140 by means of one or more threaded mounting studs 144 projecting through mounting openings 145 in the canister bottom wall. As before described, the inflator 140 will have a plurality of inflation gas exhaust ports (not shown). On the internal surface of sidewalls 128 and 130 are a first set of slotted airbag mounting channels 148, 150 receiving retaining rods 152, 154 secured in the mouth portion 156 of head/torso airbag 158. The external surfaces of the canister sidewall 128 is provided with a second set of slotted airbag mounting channels 160, 162 receiving the retaining rods 164, 166 in the mouth portion 168 of a knee airbag 170. The outer surface of the portion of the knee airbag 170 opposite mouth portion 168 has attached thereto a knee bolster panel 172 which comprises a skin and foam 173 covered rigid metallic plate 174.

The canister sidewall 128 to which the knee airbag is mounted is provided with one or more kneebag inflation port openings 176 intermediate the second set of slotted airbag mounting channels 160, 162 for receiving inflation gases from inflator 140.

In this embodiment there is provided separate inflation gas diffuser 185 and inflation gas diverter 186 elements. The inflation gas diffuser 185 is a plate 188 extending laterally between and attached to the opposing sidewalls 128, 130 of the module canister 126 intermediate the inflator 140 and the kneebag inflation port 176. Plate 188 is provided with a plurality of spaced diffuser openings 180 therein (FIG. 4). The inflation gas diverter 186 is a solid plate 190 mounted to sidewall 128 above and adjacent the kneebag inflation port 176 and the plate projects radially inwardly and downwardly towards inflation gas diffuser 185 and over a portion of the diffuser openings 180 to divert a portion of the inflation gas out through the kneebag inflation port.

Upon actuation of inflator 140 the action is essentially similar to that previously described. A portion of the inflation gases exiting the inflator gas exhaust ports is directed through the diffuser ports 180 in inflation gas diffuser 185 and then diverted by inflation gas diverter 186 through kneebag inflation port 176, as illustrated by arrow 192, into knee airbag 170, while a large portion of the inflation gases is diffused through diffuser ports 180 directly into the mouth 156 of head/torso airbag 158, as illustrated by arrows 194.

There is preferably employed a one-way valve 184 to permit inflation gas, represented by arrow 192, to enter the knee airbag 170 through kneebag inflation port 176 but prevent escape of inflation gas out the kneebag inflation port. The one-way valve 184 is preferably a flapper valve of resiliently flexible thermoplastic film mounted proximate the kneebag inflation port 176 on the outside surface of sidewall 128, although any suitable one-way valve may be employed.

The canister and module assembly of this invention permit concurrent inflation of the head/torso airbag and knee airbag as well as deployment of the knee bolster panel from a single inflation source. Moreover, the canister and module assembly allow deployment of the head/torso airbag even if an out-of-position occupant prevents deployment of the knee airbag. The design of this invention also has the diffuser-deflector as an integral part of the canister. By proper choice of the size, shape and arrangement, such as the angle of the diverter, appropriate portions of inflation gases can be apportioned between the head/torso airbag and the knee airbag. This invention can also produce a significant reduction in knee airbag and knee bolster deployment time compared to previous arrangements and also at a lower cost. Additionally, the assembly of this invention can utilize a less aggressive inflator and allow for a more traditional and ergonomic packaging area for the assembly and a glove compartment in the vehicle.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A vehicle occupant restraint module assembly comprising an occupant head/torso airbag and a knee airbag for concurrent deployment from a single inflator, said assembly comprising:

a trough-shaped module canister comprising a bottom wall, and first and second opposing sidewalls and first and second opposing endwalls extending therefrom and forming a trough opening opposite said bottom wall, said first sidewall having at least one kneebag inflation port therein;

an inflator having a plurality of inflator gas exhaust ports and mounted along said bottom wall of the canister;

an occupant head/torso airbag mounted to said module canister for receiving inflation gases from the inflation gas exhaust ports of the inflator into a mouth of said head/torso airbag through the trough opening;

an occupant knee airbag mounted to said module canister for receiving inflation gases from the inflator gas exhaust ports of the inflator into a mouth of said knee airbag through the at least one kneebag inflation port in the first sidewall of the module canister; and an inflation gas diffuser and an inflation gas diverter mounted in said module canister intermediate the inflation gas exhaust ports of the inflator and the mouth of the head/torso airbag for diffusing a first portion of inflation gases from the inflator into the mouth of the head/torso airbag and for diverting a second portion of the inflation gases from the inflator into the mouth of the knee airbag through the at least one kneebag inflation port in the first sidewall of the module canister.

2. A vehicle occupant restraint module assembly according to claim 1 wherein the inflation gas diffuser and the inflation gas diverter comprise a unitary one-piece member extending between the first and second sidewalls of the module canister.

3. A vehicle occupant restraint module assembly of claim 2 wherein said unitary one-piece diffuser diverter member comprises a generally open V-shaped plate member having a plurality of diffuser openings longitudinally proximate a first edge of the plate member and a solid diverter plate portion longitudinally adjacent an opposite second edge of the plate member.

4. A vehicle occupant restraint module assembly according to claim 3 wherein a one-way valve member is mounted adjacent the at least one kneebag inflation port for permitting inflation gas to enter the knee airbag through said at least one kneebag inflation port and preventing escape of inflation gas from the knee airbag out said kneebag inflation port.

5. A vehicle occupant restraint module assembly of claim 4 additionally comprising a knee bolster panel attached to said knee airbag opposite the mouth of the knee airbag.

6. A vehicle occupant restraint module assembly according to claim 1 wherein a one-way valve member is mounted adjacent the at least one kneebag inflation port for permitting inflation gas to enter the knee airbag through said at least one kneebag inflation port and preventing escape of inflation gas from the knee airbag out said kneebag inflation port.

7. A vehicle occupant restraint module assembly of claim 6 additionally comprising a knee bolster panel attached to said knee airbag opposite the mouth of the knee airbag.

8. A vehicle occupant restraint module assembly of claim 1 wherein said at least one kneebag inflation port in said first sidewall comprises a single elongated longitudinal slot in said first sidewall.

9. A vehicle occupant restraint module assembly of claim 8 additionally comprising a knee bolster panel attached to said knee airbag opposite the mouth of the knee airbag.

10. A vehicle occupant restraint module assembly of claim 1 wherein said inflation gas diffuser comprises a plate member extending laterally between the opposing sidewalls of the module canister intermediate the inflator and the at least one kneebag inflation port, said inflation gas diffuser defining a plurality of longitudinally spaced diffuser ports therealong, and said inflation gas diverter comprises a plate member mounted to an internal surface of said first sidewall above and adjacent the at least one kneebag inflation port, said inflation gas diverter plate projecting inwardly from said sidewall and downwardly toward said inflation gas diffuser.

11. A vehicle occupant restraint module assembly of claim 10 wherein a one-way valve member is mounted adjacent the at least one kneebag inflation port for permitting inflation gas to enter the knee airbag through said at least one kneebag inflation port and preventing escape of inflation gas from the knee airbag out said kneebag inflation port.

12. A vehicle occupant restraint module assembly of claim 11 additionally comprising a knee bolster panel attached to said knee airbag opposite the mouth of the knee airbag.

13. A trough-shaped canister for a vehicle occupant restraint module assembly comprising an occupant head/torso airbag and a knee airbag for concurrent deployment from a single inflator, said trough-shaped canister comprising:

a bottom wall, and first and second opposing sidewalls and first and second opposing endwalls extending therefrom and forming a trough opening opposite said bottom wall, said first sidewall having at least one kneebag inflation port therein;

means on internal surfaces of said first and second sidewalls for mounting an occupant head/torso airbag to said canister for receiving a first portion of inflation gases into a mouth of said head/torso airbag through the trough opening from an inflator mountable along the wall of the canister;

means on an external surface of said first sidewall for mounting an occupant knee airbag to said canister for receiving a second portion of inflation gases into a mouth of said knee airbag through the at least one kneebag inflation port in the first sidewall of the canister from an inflator mountable along the bottom wall of the canister; and an inflation gas diffuser and an inflation gas diverter mounted in said canister intermediate the bottom wall and the means on the internal surfaces of the sidewalls for mounting the head/torso airbag for diffusing the first portion of inflation gases into the head/torso airbag and for diverting the second portion of the inflation gases from the inflator into the knee airbag through the at least one kneebag inflation port in the first sidewall of the canister.

14. A trough-shaped canister according to claim 13 wherein the inflation gas diffuser and the inflation gas diverter comprise a unitary one-piece member between the first and second sidewalls of the module canister.

15. A trough-shaped canister of claim 14 wherein said unitary one-piece diffuser diverter member comprises a generally open V-shaped plate member having a plurality of diffuser openings longitudinally proximate a first edge of the plate member and a solid diverter plate portion longitudinally adjacent an opposite second edge of the plate member.

16. A trough-shaped canister according to claim 15 wherein a one-way valve member is mounted on the internal surface of the first sidewall adjacent the at least one kneebag inflation port for permitting inflation gas to enter the knee airbag through said at least one kneebag inflation port and preventing escape of inflation gas from the knee airbag out said kneebag inflation port.

17. A trough-shaped canister according to claim 13 wherein a one-way valve member is mounted adjacent the at least one kneebag inflation port for permitting inflation gas to enter the knee airbag through said at least one kneebag inflation port and preventing escape of inflation gas from the knee airbag out said kneebag inflation port.

18. A trough-shaped canister of claim 13 wherein said at least one kneebag inflation port in said first sidewall comprises a single elongated longitudinal slot in said first sidewall.

19. A trough-shaped canister of claim 13 wherein said inflation gas diffuser comprises a plate member extending laterally between the opposing sidewalls of the canister intermediate the bottom wall and the at least one kneebag inflation port, said inflation gas diffuser defining a plurality of longitudinally spaced diffuser ports therealong, and said inflation gas diverter comprises a plate member mounted to the internal surface of said first sidewall above and adjacent the at least one kneebag inflation port, said inflation gas diverter plate projecting inwardly from said sidewall and downwardly toward said inflation gas diffuser.

20. A trough-shaped canister of claim 19 wherein a one-way valve member is mounted on the external surface of said first sidewall adjacent the at least one kneebag inflation port for permitting inflation gas to enter the knee airbag through said at least one kneebag inflation port and preventing escape of inflation gas from the knee airbag out said kneebag inflation port.

* * * * *